United States Patent
De Mango

(10) Patent No.: US 10,278,535 B2
(45) Date of Patent: May 7, 2019

(54) MACHINE FOR THE PREPARATION OF BEVERAGES, WITH MICROPHONE SENSOR

(71) Applicant: LUIGI LAVAZZA S.p.A., Turin (IT)

(72) Inventor: Carlo De Mango, Turin (IT)

(73) Assignee: LUIGI LAVAZZA S.P.A., Turin (IT)

(*) Notice: Subject to any disclaimer, the term of this patent is extended or adjusted under 35 U.S.C. 154(b) by 196 days.

(21) Appl. No.: 15/109,673

(22) PCT Filed: Feb. 6, 2015

(86) PCT No.: PCT/IB2015/050912
§ 371 (c)(1),
(2) Date: Jul. 5, 2016

(87) PCT Pub. No.: WO2015/118495
PCT Pub. Date: Aug. 13, 2015

(65) Prior Publication Data
US 2016/0324364 A1   Nov. 10, 2016

(30) Foreign Application Priority Data

Feb. 6, 2014   (IT) .............................. TO2014A0096

(51) Int. Cl.
*A47J 31/24*   (2006.01)
*A47J 31/36*   (2006.01)
(Continued)

(52) U.S. Cl.
CPC ............... *A47J 31/46* (2013.01); *A47J 31/24* (2013.01); *A47J 31/44* (2013.01); *A47J 31/36* (2013.01)

(58) Field of Classification Search
CPC .. A47J 31/24; A47J 31/36; A47J 31/46; A47J 31/44
See application file for complete search history.

(56) References Cited

U.S. PATENT DOCUMENTS

2007/0009365 A1*  1/2007  Litterst .................. B67D 1/102
                                                           417/44.1
2008/0050480 A1*  2/2008  Doglioni Majer .. A47J 31/3609
                                                              426/231
(Continued)

FOREIGN PATENT DOCUMENTS

DE   10 2009 045 069 A1   5/2011
DE   10 2012 210 270 A1   12/2013
(Continued)

OTHER PUBLICATIONS

International Search Report of PCT/IB2015/050912, dated Jul. 3, 2015. [PCT/ISA/210].

*Primary Examiner* — Reginald Alexander
(74) *Attorney, Agent, or Firm* — Sughrue Mion, PLLC

(57) ABSTRACT

A machine for the preparation of beverages, including a brewing assembly (10) adapted to receive an amount or dose of a substance (11) for preparing a beverage, a pump (4) provided with an electric motor (8) for pumping a flow of liquid towards and through the brewing assembly (10); a flowrate detector (6) associated with the pump (4); a microphone sensor (20) adapted to provide electric signals indicating the loudness of the noise generated by the machine (1) during operation, and control circuits (ECU, 15) connected to the microphone sensor (5), the flowrate detector (6) and the pump (4) and designed to activate the pump (4) for preparation of a beverage depending on the signals provided by the microphone sensor (20) and by the flowrate detector (6).

10 Claims, 2 Drawing Sheets

(51) Int. Cl.
*A47J 31/44* (2006.01)
*A47J 31/46* (2006.01)

(56) References Cited

U.S. PATENT DOCUMENTS

| | | |
|---|---|---|
| 2010/0282087 A1 | 11/2010 | Boussemart et al. |
| 2011/0190694 A1* | 8/2011 | Lanier, Jr. ......... A61M 5/14216 604/67 |
| 2011/0265657 A1 | 11/2011 | Icardi |

FOREIGN PATENT DOCUMENTS

| | | |
|---|---|---|
| WO | 2009/092745 A1 | 7/2009 |
| WO | 2010/076760 A2 | 7/2010 |
| WO | 2011/095026 A1 | 8/2011 |

* cited by examiner

MACHINE FOR THE PREPARATION OF BEVERAGES, WITH MICROPHONE SENSOR

CROSS-REFERENCE TO RELATED APPLICATIONS

This application is a National Stage of International Application No. PCT/IB2015/050912 filed Feb. 6, 2015, claiming priority based on Italian Patent Application No. TO2014A000096, filed Feb. 6, 2014, the contents of all of which are incorporated herein by reference in their entirety.

BACKGROUND OF THE INVENTION

Field of the Invention

The present invention relates in general to machines for the preparation of beverages.

Background

More specifically the invention relates to a machine for the preparation of beverages of the type defined in the introductory part or preamble of the accompanying claim 1.

A machine of this type is described in the German patent application No. DE 102009045069 A1. In this machine according to the prior art a microphone sensor connected to a microcontroller is provided. The microcontroller is designed to detect, from an analysis of the signal of the microphone sensor, the first stroke of the pump (which is of the plunger type) following activation of the pump and to determine the duration during the time interval between activation and said first stroke. From this information the microcontroller deduces the flowrate of the flow generated by the pump and thus avoids the use, for this purpose, of a flowmeter, which is a relatively costly device.

These machines for the preparation of beverages, in particular hot beverages, for example coffee, with or without the use of capsules or pods containing prepackaged doses, are widespread both for use in a home environment and for use in a public place, for example in offices and the like.

In these machines, in order to prepare a beverage, a pump, for example of the vibration type, is activated, which inevitably generates an acoustic noise, the level of which may in some cases be somewhat bothersome.

In the machine according to DE 10 2009 045069 A1 the microphone sensor may also be used to detect the noise generated during operation of the pump and to drive the pump so as to reduce the bothersome noise generated.

The pumps used in such machines for the preparation of beverages are inevitably subject to dimensional tolerances and tolerances for the mechanical and/or electrical characteristics of their components. Owing to these tolerances of the components, as well as the assembly tolerances, the individual pumps of a same type produce in general, when excited by a current with predetermined characteristics, a noise with different characteristics and generate liquid flows with different flowrates.

This has the effect that machines which are nominally identical and equipped with pumps which are nominally identical may produce beverages with characteristics which are significantly different from each other.

An object of the present invention is to provide a machine for the preparation of beverages which is able to overcome said drawback of the machines according to the prior art.

SUMMARY OF THE INVENTION

This object, along with other objects, is achieved according to the present invention by a machine, the main characteristics of which are described and claimed herein.

BRIEF DESCRIPTION OF THE DRAWINGS

Further characteristic features and advantages of the invention will become clear from the following detailed description provided purely by way of a non-limiting example, with reference to the accompanying drawings in which.

DETAILED DESCRIPTION OF THE INVENTION

Figure 1:
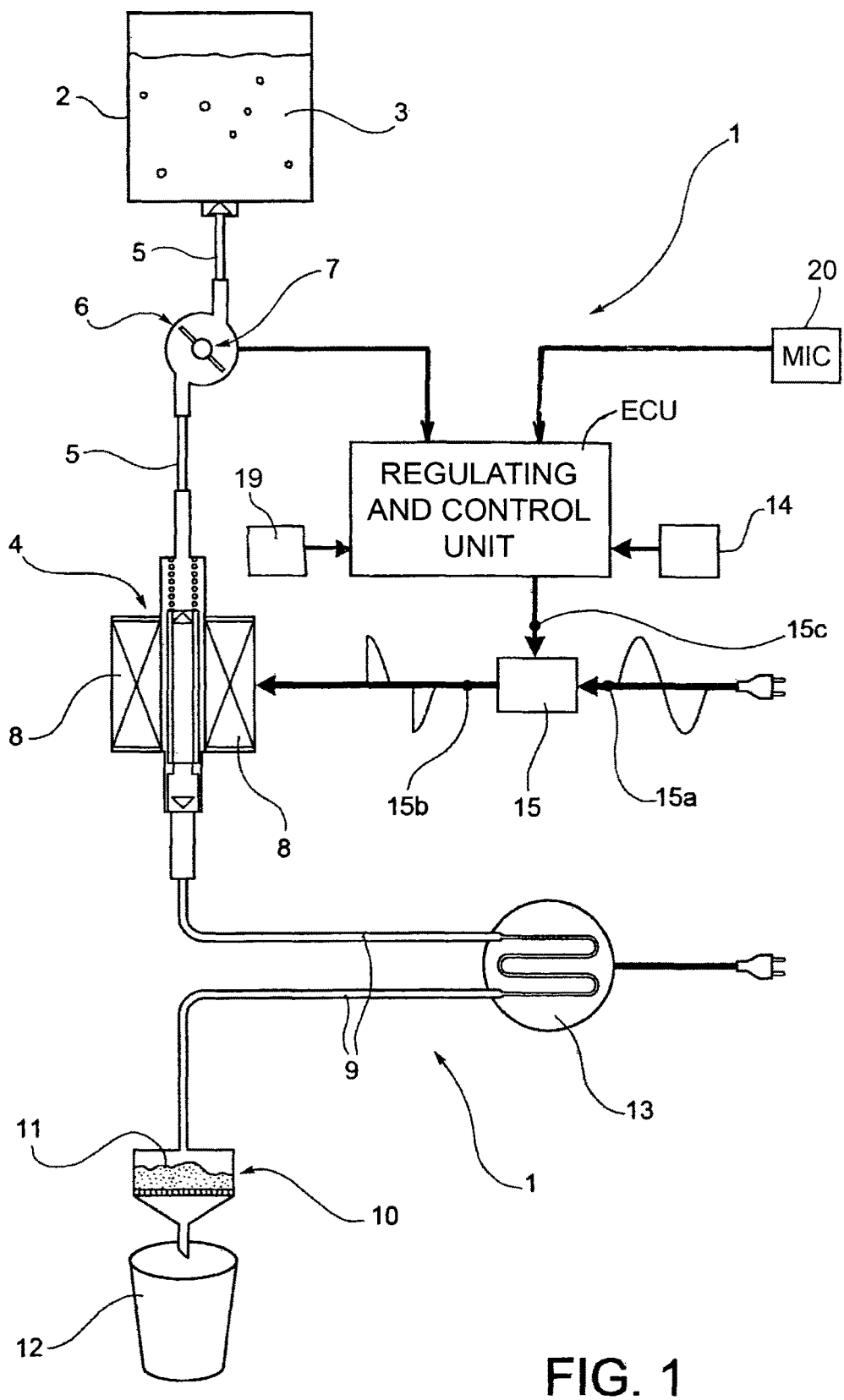
FIG. 1 is an illustration, partly in block diagram form, showing qualitatively the structure of a machine for the preparation of beverages according to the present invention.

FIG. 1 shows, denoted overall by 1, a machine for the preparation of beverages according to the present invention.

In the embodiment shown in schematic form, the machine 1 comprises a storage tank 2 for containing a quantity of a liquid 3, in particular water, sufficient for the preparation of several beverages.

The storage tank 2 is connected to the input or intake side of an electric pump 4 via a pipe 5 along which an electric flowrate sensor 6 is arranged. This sensor 6 is of a type known per se, for example of the type comprising a turbine 7 able to be rotationally operated at a variable speed upon variation in the flowrate of the liquid flowing inside the pipe or duct 5.

The pump 4 may be conveniently of the vibration type, comprising an excitation winding 8 intended to be supplied with an alternating-current voltage.

Via a piping 9, the output or delivery of the pump 4 is connected to a brewing assembly denoted overall by 10.

The brewing assembly 10 is of the type known per se, for example for brewing using capsules, pods or the like containing prepackaged amounts or doses of a substance for the preparation of a beverage, for example ground roasted coffee. An example of a brewing assembly of this type is described in international application WO2010/076760 in the name of the same Applicant.

Alternatively, the brewing assembly 10 may be one of the various types known per se in which the substance for preparation of a beverage is loaded in each case in loose form (i.e. not prepackaged). A brewing assembly of this type is described for example in international application WO2011/095026 likewise in the name of the same Applicant.

In the extremely schematic illustration shown in FIG. 1, 11 denotes the substance used in the brewing assembly 10 for preparation of a beverage, the latter being dispensed into a collection container such as a cup or a glass 12.

An electric heating device, such as that denoted overall by 13 in FIG. 1, may be conveniently arranged between the pump 4 and the brewing assembly 10.

The machine 1 further comprises selection/control devices 14 of the known type, for example pushbuttons, which can be operated by a user in order to activate the preparation of a selected beverage.

These control and selection means 14 are connected to an electronic control and regulating unit 10, denoted overall by ECU. The flowrate sensor device 6 is also connected to said unit ECU.

The machine 1 also comprises an electric power variator device, denoted by 15 in FIG. 1. This device has a power supply input 15a, intended to be connected to an alternating-current electric energy source, for example to an electric power supply network operating at 230V, 50 Hz (60 Hz), and an output 15b connected to the excitation winding 8 of the pump 4.

The power variator device 15 is formed for example using a so-called dimmer (alternating voltage variator with variable trigger phase angle) and also has a control input 15c, intended to receive from the control and regulating unit ECU variable regulation signals able to cause a variation in the electric power supplied to the pump 4.

The machine 1 further comprises an electric sensor of the microphone type, denoted by 20 in FIG. 1.

This sensor 20 is designed to provide electric signals indicating the loudness of the noise generated, during operation, by the machine 1 and, primarily, by the electric pump 4.

A disabling device 19, the functions of which will be described below, is also connected to the electronic control and regulating unit ECU. This disabling device 19 may be incorporated in the control and selection means 14 described above.

The control and regulating unit ECU is in particular designed to acquire the signal emitted during operation by the microphone sensor 20 and assess the level or loudness of the noise generated by the machine 1 during operation.

This unit ECU is also designed to apply to the control input 15c of the power variator device 15 a regulation signal for activating supplying to the pump 4 of an electric power which is variable depending on the level of the acoustic noise generated, as indicated by the signals of the microphone sensor 20, so as to tend to keep the loudness of this noise below a predetermined threshold value.

This feature is particularly advantageous in the case where the machine 1 is used in a public place, for example in an office, in order to reduce significantly the inconvenience which otherwise might arise as a result of its noisiness during operation.

Preferably, although not necessarily, the unit ECU may be designed to detect, by means of the microphone sensor 20, the loudness of the surrounding noise before the start of preparation of the beverage and to drive the winding 8 of the pump 4 during the preparation of the beverage depending on the difference between the instantaneous loudness of the noise detected and the loudness of the surrounding noise detected before the start of preparation of the beverage, so as to reduce this difference.

The variation in the electric power supplied to the pump 4 may be obtained by varying the regulation of the waveform of the alternating current (voltage) supplied to the excitation winding 8 of the pump and/or variation of the frequency of this current (voltage).

The controlling action of the unit ECU on driving of the motor 8 of the pump 4 may optionally be excluded by the user, if desired, by operating the disabling device 19.

The electronic control and regulating unit ECU is conveniently designed to apply to the winding 8 of the pump 4, during testing of the machine 1 while the brewing assembly 10 is in a predetermined condition, an excitation alternating current with predetermined characteristics, and to detect correspondingly, by means of the microphone sensor 20 and the flowrate detector 6, the loudness of the noise and the flowrate of the flow which are generated by the pump 4 and detect their differences compared to respective, predetermined, stored reference values. The unit ECU is also designed to determine therefore, depending on said interference, the characteristics (such as the trigger phase angle, the amplitude and the frequency) of the voltage to be applied subsequently, during use of the machine, to the winding 8 of the pump 4.

Owing to these characteristics, it is possible to reduce substantially the differences between the operating characteristics of the pumps, due to their manufacturing tolerances, and correspondingly reduce the differences between the characteristics of the beverages produced.

The control and regulating unit ECU may also be conveniently designed to apply to the control input 15c of the power variator device 15 a regulation signal able to activate, during preparation of a beverage, supplying to the pump 4 of an electric power which also varies depending on the signals provided by the control and selection means 14 and/or by the flowrate sensor 6.

The pump 4 may thus be supplied with an electric power which varies over time in accordance with a predetermined relationship depending on the detected value of the liquid flowrate through the pump 4 and the brewing assembly 10 and/or the type of beverage selected by the user.

Figure 2:
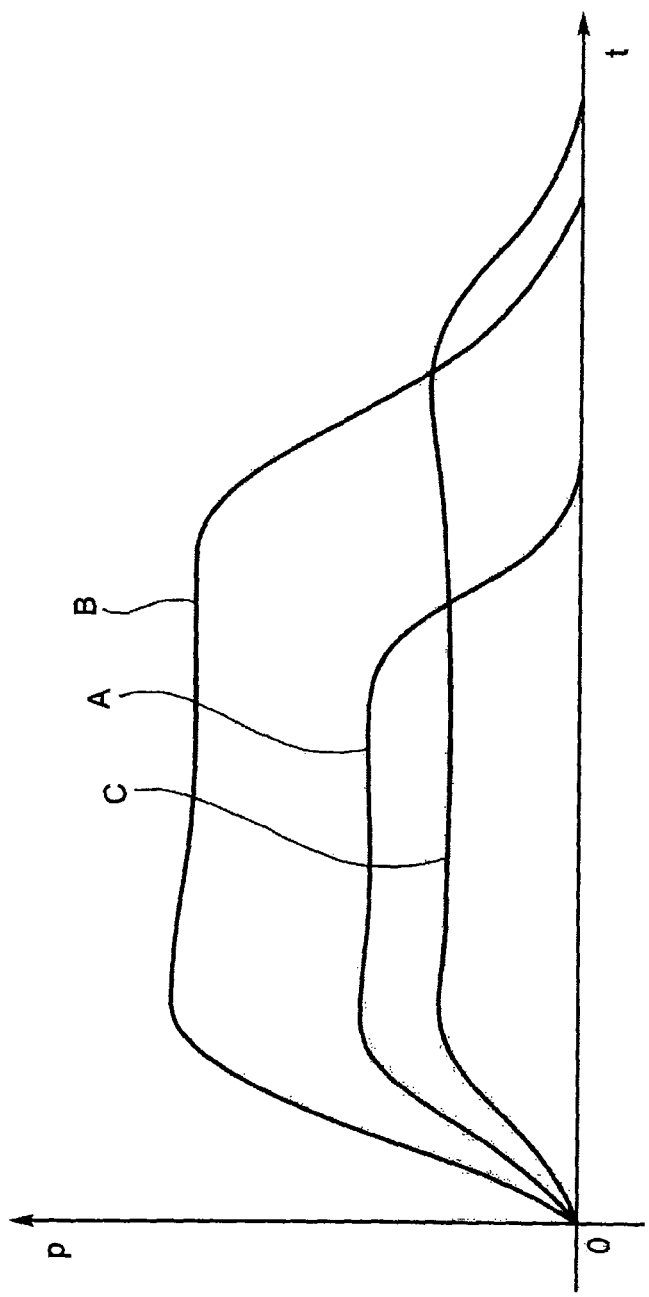
FIG. 2 is a series of diagrams showing, as a function of the time t shown along the x axis, three different progressions of the electric power P applied to the pump of a machine according to the invention, for the preparation of various beverages.

In FIGS. 2, A, B and C indicate three possible temporal progressions of the electric power P applied to the pump 4, for the preparation of three different types of beverage.

The progression indicated by A corresponds for example to the preparation of a beverage with a reduced quantity of a soluble substance, which is lightly compressed or not compressed at all. With this substance, the hydraulic resistance offered inside the brewing assembly 10 to the water flow supplied by the pump 4 is relatively small. Consequently, this flow will be fairly strong so that the dispensing time may be relatively short.

The progression indicated by B corresponds instead to the preparation of a beverage with the use of a relatively large amount of substance 11, in a fairly compacted form, such that a correspondingly high hydraulic resistance opposes the flow of the water. The electric power P applied to the pump 4 and the duration of activation of this pump are therefore increased.

The progression indicated by C refers to the preparation of a "long" beverage with use of a small amount of a substance 11 which offers a low resistance to the water flow inside the brewing assembly. In this case the electric power applied to the pump 4 is significantly reduced, but the duration of activation of the pump, and therefore of dispensing of the beverage, may be somewhat longer.

The control and regulating unit ECU may be designed to drive the power variator device 15 depending on the signals of the flowrate sensor 6 or the signals of the control and selection means 14 or the signals provided by both.

The signal provided by the flowrate sensor 6 allows the regulating and control unit ECU to "recognize" the characteristics of the substance 11 used for preparation of the beverage. In fact, in the case, for example, of preparation of a coffee, if ground roasted coffee is used, in a large amount and very compacted form, the water flow induced by the pump 4 inside the brewing assembly 10 encounters a significant resistance, and the signal provided by the flowrate sensor 6 will indicate a weak flow. In this case, the regulating and control unit ECU drives the power variator device 15 so as to increase the electric power applied to the pump 4 so as to increase correspondingly the flow.

On the other hand, when a small uncompressed amount of the substance 11 is used, the water flow induced by the pump 4 encounters inside the brewing assembly 10 a smaller resistance. The flowrate sensor 6 signals in this case a stronger flow, and the regulating and control unit ECU drives the power variator device 15 so as to reduce the electric power applied to the pump 4, thereby correspondingly reducing the flowrate of the flow.

Owing to the possibility of "modulating" the electric power applied to the pump 4, it is possible to adapt in an optimum manner the operation to the characteristics of the substance 11 used in each case and/or depending on the type of beverage selected by the user, with improved results from the point of view of the organoleptic properties of the beverages prepared.

Obviously, without altering the principle of the invention, the embodiments and the constructional details may be greatly varied with respect to that described and illustrated purely by way of a non-limiting example, without thereby departing from the scope of the invention as defined in the accompanying claims.

Thus, for example, the flowrate sensor 6 may be located downstream, instead of upstream, of the pump 4. Moreover, the regulating and control unit ECU may be designed to drive the power variator device 15 not only depending on the signals provided by the flowrate sensor 6 and/or by the control and selection means 14, but also depending on further signals provided by other sensors with which the machine 1 is provided, such a sensor for the temperature of the liquid downstream of the heater 13, a sensor for the hardness of the water contained in the storage tank 2, etc.

The invention claimed is:

1. A machine for preparing beverages, comprising:
   a brewing assembly adapted to receive an amount or dose of a substance for preparing a beverage;
   a pump provided with an alternating-current electric motor for pumping a flow of liquid towards and through the brewing assembly;
   an electric flowrate detector arranged so as to provide an electric signal indicating the flowrate of said liquid upstream or downstream of the pump;
   a microphone sensor adapted to provide electric signals indicating the loudness of the noise generated by the machine during operation; and
   a controller connected to the microphone sensor and the pump and configured to drive the motor of the pump for preparation of a beverage in such way as to control the loudness of said noise, to analyse the signals provided by the microphone sensor and the flowrate detector, to apply to the electric motor of the pump, during testing of the machine while the brewing assembly is in a predetermined condition, an excitation alternating current with predetermined characteristics, and correspondingly detect, by means of the microphone sensor and the flowrate detector, the loudness of the noise and the flowrate of the flow generated by the pump and detect their differences compared to respective predetermined reference values, and to modify at least one characteristic of the excitation current to be applied subsequently, during use of the machine, to the motor of the pump depending on said differences detected; and
   indicator means adapted to provide said controller with electric signals indicating at least one characteristic of a beverage to be prepared,
   wherein said controller is configured to activate supplying to the motor of the pump of an electric power (P) which is variable in a predetermined manner depending on the signal provided by said indicator means and/or the signal provided by the microphone sensor.

2. The machine according to claim 1, wherein the motor of the pump is an alternating-current motor, and said controller comprises an electric power variator device having a supply input intended to be connected to an alternating current electric power source, an output connected to the motor of the pump, as well as a control input intended to receive a variable regulation signal; and
   an electronic regulating unit (ECU) connected to the microphone sensor, the flowrate detector, the indicator means and the control input of the power variator device and designed to apply to said control input of the power variator device a regulation signal for activating supplying to the motor of the pump of an electric power (P) which is variable in a predetermined manner.

3. The machine according to claim 2, wherein said power regulating device comprises an alternating-voltage variator with a variable trigger phase angle and/or variable frequency.

4. The machine according to claim 1, wherein said indicator means comprise at least one detector adapted to provide electric signals indicating the value of at least one detected parameter relating to the beverage being prepared.

5. The machine according to claim 1, wherein said to detect by means of the microphone sensor the loudness of the surrounding noise before the start of preparation of a beverage and to drive the motor of the pump during the preparation of the beverage depending on the difference between the instantaneous loudness of the noise detected and the loudness of the surrounding noise detected before the start of preparation of the beverage.

6. Machine according to claim 1, wherein said indicator means comprise control and selection means which can be operated by a user for starting the preparation of a selected beverage.

7. The machine according to claim 1, wherein said regulating unit (ECU) is designed to drive the power variator device depending on the signals provided by said indicator means such that the preparation of a beverage the pump is supplied with an electric power (P) which varies over time (t) in accordance with a predetermined relationship (A, B; C . . . ) depending on the detected value of said at least one parameter and/or the kind of beverage selected by the user.

8. A machine for preparing beverages, comprising:
   a brewing assembly adapted to receive an amount or dose of a substance for preparing a beverage;
   a pump provided with an alternating-current electric motor for pumping a flow of liquid towards and through the brewing assembly;
   an electric flowrate detector arranged so as to provide an electric signal indicating the flowrate of said liquid upstream or downstream of the pump;
   a microphone sensor adapted to provide electric signals indicating the loudness of the noise generated by the machine during operation;
   a controller connected to the microphone sensor and the pump and configured to drive the motor of the pump for preparation of a beverage in such way as to control the loudness of said noise and to analyse the signals provided by the microphone sensor and the flowrate detector, to apply to the electric motor of the pump, during testing of the machine while the brewing assembly is in a predetermined condition, an excitation alternating current with predetermined characteristics, and correspondingly detect, by means of the microphone sensor and the flowrate detector, the loudness of the noise and the flowrate of the flow generated by the pump and detect their differences compared to respective predetermined reference values, and to modify at least one characteristic of the excitation current to be applied subsequently, during use of the machine, to the motor of the pump depending on said differences detected; and a disabling device connected to said controller and able to disable the regulation of driving of the motor of the pump depending on the signal from the microphone sensor.

9. The machine according to claim 8, wherein said disabling device is comprised in said indicator means.

10. The machine according to claim 9, wherein said regulating unit (ECU) is designed to vary the time duration of activation of the pump.

* * * * *